United States Patent [19]

Olds et al.

[11] Patent Number: 5,444,450

[45] Date of Patent: Aug. 22, 1995

[54] RADIO TELECOMMUNICATIONS SYSTEM AND METHOD WITH ADAPTIVE LOCATION DETERMINATION CONVERGENCE

[75] Inventors: Keith A. Olds, Mesa; Kristine P. Maine, Phoenix, both of Ariz.

[73] Assignee: Motorola, Inc., Schaumburg, Ill.

[21] Appl. No.: 105,219

[22] Filed: Aug. 11, 1993

[51] Int. Cl.⁶ ............................ G02S 5/02; H04B 1/00; H04M 11/00
[52] U.S. Cl. .................................. 342/357; 455/54.1; 379/60
[58] Field of Search ................... 342/357, 352, 356; 455/54.1, 54.2, 12.1; 379/59, 60

[56] References Cited

U.S. PATENT DOCUMENTS

| | | | |
|---|---|---|---|
| 4,445,118 | 4/1984 | Taylor et al. | 342/357 |
| 4,578,678 | 3/1986 | Hurd | 342/357 |
| 4,672,382 | 6/1987 | Fukuhark et al. | 342/357 |
| 4,728,959 | 3/1988 | Maloney et al. | 342/457 |
| 4,797,677 | 1/1989 | MacDoran et al. | 342/352 |
| 4,860,352 | 8/1989 | Laurence et al. | 380/23 |
| 5,041,833 | 8/1991 | Weinberg | 342/357 |
| 5,119,101 | 6/1992 | Barnard | 342/357 |
| 5,119,504 | 6/1992 | Durboraw, III | 455/54.1 |
| 5,177,489 | 1/1993 | Hatch | 342/357 |

OTHER PUBLICATIONS

"Emitter Location Accuracy using TDOA and Differential Doppler" by Paul C. Chestnut, from IEEE Transactions on Aerospace and Electronic Systems, vol. AES-18, No. 2, Mar., 1982.

"Geolocation of Frequency-Hopping Transmitters via Satellite" by A. Sonnenschein and W. K. Hutchinson, from Technical Reporty 900, Nov. 1990.

"Geolocation via Satellite: A Methodology and Error Analysis" by M. J. Shensa, from Technical Report 1224, May 1988.

Primary Examiner—Gregory C. Issing
Attorney, Agent, or Firm—Gregory J. Gorrie; Robert M. Handy

[57] ABSTRACT

A radio telecommunications system includes a number of satellites in low earth orbits. Subscriber units communicate with the satellites. A single subscriber unit communicates with a single satellite using electromagnetic signals so that a measurement processor can obtain Doppler component, propagation duration, and real time measurements of the signals. A location processor converts these measurements into a geographic location with respect to the earth through an iterative process. The location processor determines the accuracy required for each location determination, and performs only the number of iterations needed to meet the accuracy requirements. A service processor determines which qualifications to apply to communication services offered by the system. These qualifications are based on the subscriber unit's location.

21 Claims, 7 Drawing Sheets

RADIO TELECOMMUNICATIONS SYSTEM AND METHOD WITH ADAPTIVE LOCATION DETERMINATION CONVERGENCE

CROSS-REFERENCE TO RELATED APPLICATIONS

This application is related to commonly assigned United States Patent Applications:

"Multibeam Position Ambiguity Resolution", by Keith Olds, Attorney Docket Number IRI03065;

"Position Ambiguity Resolution", by Stanley Attwood, Attorney Docket Number IRI03048;

"Geolocation Responsive Radio Telecommunication System and Method Therefor", by Kristine Maine, Keith Olds, and Gerald Davieau, Attorney Docket Number IRI03052; and "Location System and Method with Acquistion of Accurate Location Parameters", by Kristine Maine, Keith Olds and Stanley Attwood, Attorney Docket Number IRI03053.

TECHNICAL FIELD OF THE INVENTION

The present invention relates generally to radio telecommunications systems that provide communication services for the system's users. More specifically, the present invention relates to radio telecommunications systems in which communications are relayed through satellites and in which locations of users' subscriber units are determined.

BACKGROUND OF THE INVENTION

A need exists for a substantially global radio telecommunications system that can provide communication services to substantially any point on or near the surface of the earth. For such a system to achieve widespread acceptance, it should be capable of operating with portable subscriber units. In order for subscriber units to have acceptable portability, they should be capable of low power battery operation, and they should be capable of transmitting and receiving electromagnetic signals through a relatively small antenna. In addition, such a system should use only portions of the electromagnetic spectrum which are allocated to it by governments within whose geopolitical jurisdictions the system is used.

In such a global radio telecommunications system, subscriber units may be placed in the control of system users, and the users may move their subscriber units to any place on or near the surface of the earth. In short, the system and those who operate the system may have no control over where the subscriber units are located. On the other hand, the system may be responsible for granting or denying particular communication services depending upon whether or not the system has received permission to operate at a point where a particular subscriber unit may happen to be located. Moreover, the system may be responsible for billing in connection with the use of communication services, and the rates charged for such services and parties to receive revenues from the services may vary from location to location.

A radio telecommunications system may carry out the job of granting and denying particular communication services and assigning particular billing rates to calls if it knows the locations of the subscriber units. Accordingly, it would be desirable to configure the system so that the locations of subscriber units may be determined and so that information describing locations may be transmitted to controllers which are responsible for making decisions regarding the granting or denying of communication services, billing rates, and the like. Preferably, locations are determined as quickly as possible so that service interruptions are minimized.

Many prior art location determination systems are known, such as Global Positioning System (GPS), GLONASS, Loran, and the like. While subscriber units could be configured to incorporate components which take advantage of existing location determination systems, these components would substantially increase costs of the subscriber units. Moreover, relying on existing location determination systems could reduce reliability of the radio telecommunications system by introducing reliance upon an external system.

The techniques used by such prior art systems to determine location could potentially be incorporated into the radio telecommunications system, but the introduction of such techniques could seriously degrade communication services. For example, most prior art location systems require the use of two or more transmitters or receivers ("locators") that are located at distant positions and that are capable of transmitting or receiving signals to or from a location to be determined.

The requirement for two or more locators to be within view over the entire globe makes this approach impractical. While this requirement might be met by placing satellites in high or geosynchronous orbits around the earth, higher orbits place satellites further away from subscriber equipment on the earth. This larger distance causes the subscriber equipment to consume excessive power or incorporate massive antennas just to participate in communication services. Moreover, higher orbits require increased spectrum allocation to carry a given amount of communications because the allocated spectrum may be reused less frequently in a given area.

SUMMARY OF THE INVENTION

Accordingly, it is an advantage of the present invention that an improved radio telecommunications system and method are provided.

Another advantage of the present invention is that locations for subscriber units are determined.

Another advantage is that the present invention may determine locations for subscriber units using a single satellite which orbits the earth in a low earth orbit.

Another advantage is that the present invention determines subscriber unit locations relatively quickly.

Another advantage is that the present invention varies the accuracy to which a subscriber unit's location is determined in accordance the location itself so that time is not wasted resolving location to a greater degree of accuracy than is needed.

The above and other advantages of the present invention are carried out in one form by a method of operating a radio telecommunications system having at least one communication node and having at least one subscriber unit placed to communicate with the communication node. The method calls for communicating between the communication node and the subscriber unit to obtain a set of location parameters. A crude position for the subscriber unit is obtained in response to this set of location parameters, but the crude position has an error associated with it. A position accuracy is determined for the crude position. A decision is then made, in response to the position accuracy and error, whether to refine the crude position. The crude position may be refined by engaging in another communication, obtaining another crude position, and determining another position accuracy. When the method decides not to refine the crude position further, the crude position serves as a subscriber unit location for the system. Communication services provided for the subscriber unit are then qualified in response to this subscriber unit location.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
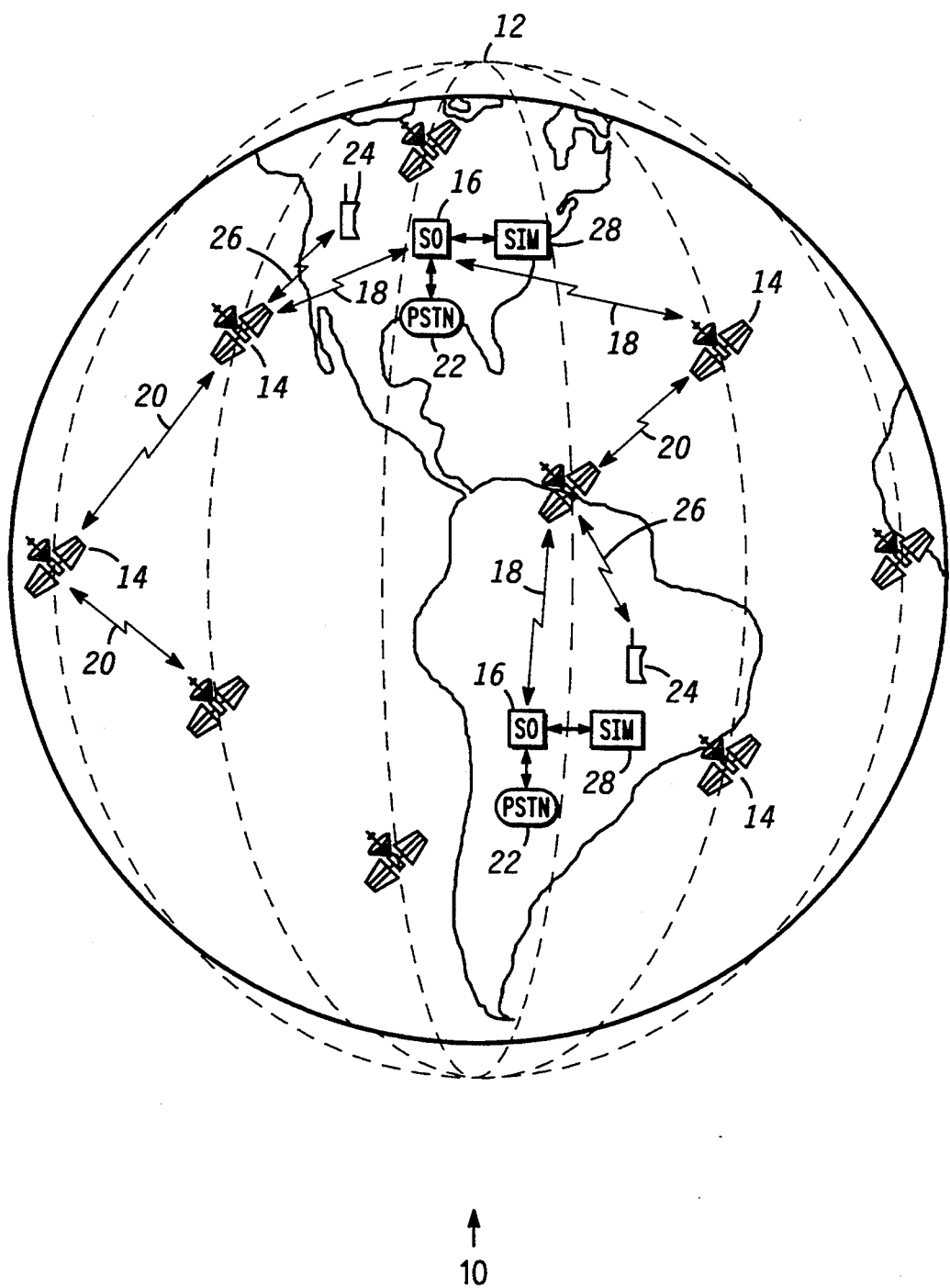
FIG. 1 shows a layout diagram of an environment within which a radio telecommunications system may operate.

FIG. 1 shows a layout diagram of an environment within which a radio telecommunications system 10 operates. System 10 includes a constellation 12 consisting of several satellites 14 placed in relatively low orbits around the earth. Each satellite 14 has a unique identification number associated with it so that satellites 14 may be distinguished from one another. Due to the configuration of constellation 12, at least one of satellites 14 is desirably within view of each point on the surface of the earth at all times.

System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any size region of the earth. However, the region controlled by each SO 16 is preferably associated with one or more specific geo-political jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of subscriber units (SUs) 24. SUs 24 may be configured as conventional portable radio communication equipment. In other words, SUs 24 may be battery powered, may consume relatively low power, and may include relatively small antennas. System 10 accommodates the movement of SUs 24 anywhere on or near the surface of the earth. However, nothing requires SUs 24 to move, and system 10 operates satisfactorily if a portion of the entire population of SUs 24 remains stationary. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26.

Any number of subscriber information managers (SIMs) 28 are also included within system 10. Each SIM 28 maintains a subscriber database that is relevant to only a discrete portion of the population of SUs 24. The database may include information describing features associated with SUs 24, rates to be associated with SUs 24, current locations for SUs 24, and other information which is discussed below. Each SU 24 is assigned to one of SIMS 28, and that one SIM 28 is considered the "home" SIM 28 for an SU 24. In the preferred embodiment, an SIM 28 may be associated with each SO 16. In fact, an SIM 28 and an SO 16 may utilize the same computerized hardware. In such an embodiment, an SIM 28 and an SO 16 are separated logically rather than physically. Each SO 16 may communicate with any SIM 28 through constellation 12, PSTN 22, or internal computer structures when an SO 16 communicates with its logical partner SIM 28.

In general terms, system 10 may be viewed as a network of nodes. Each SU 24, satellite 14, SO 16, and SIM 28 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22.

Communication services, including calls, may be set up between two SUs 24 or between any SU 24 and a PSTN phone number. Except for qualifying processes which are discussed below, calls may be set up between any two locations on the earth. Generally speaking, each SU 24 engages in control communications with a nearby SO 16 through constellation 12 during call setup. These control communications take place prior to forming a communication path between an SU 24 and another unit, which may be another SU 24 or a PSTN phone number. In particular, an SU 24 communicates with the SO 16 via one or more satellites 14. This SO 16 may be considered the serving SO for that particular SU 24.

Due to the low earth orbits, satellites 14 constantly move relative to the earth. In the preferred embodiments, satellites 14 move in orbits at an altitude in the range of 500–1000 km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between an SU 24 positioned near the surface of the earth and a satellite communication node 14 in such an orbit will require a propagation duration of 2-3 msec or more, depending on the satellite's angle of view. Moreover, electromagnetic signals traveling between an SU 24 positioned near the surface of the earth and a satellite 14 in such an orbit may experience a considerable Doppler component of frequency shift, the precise value of which is dependent on a source frequency and the satellite's angle of view.

Figure 2:
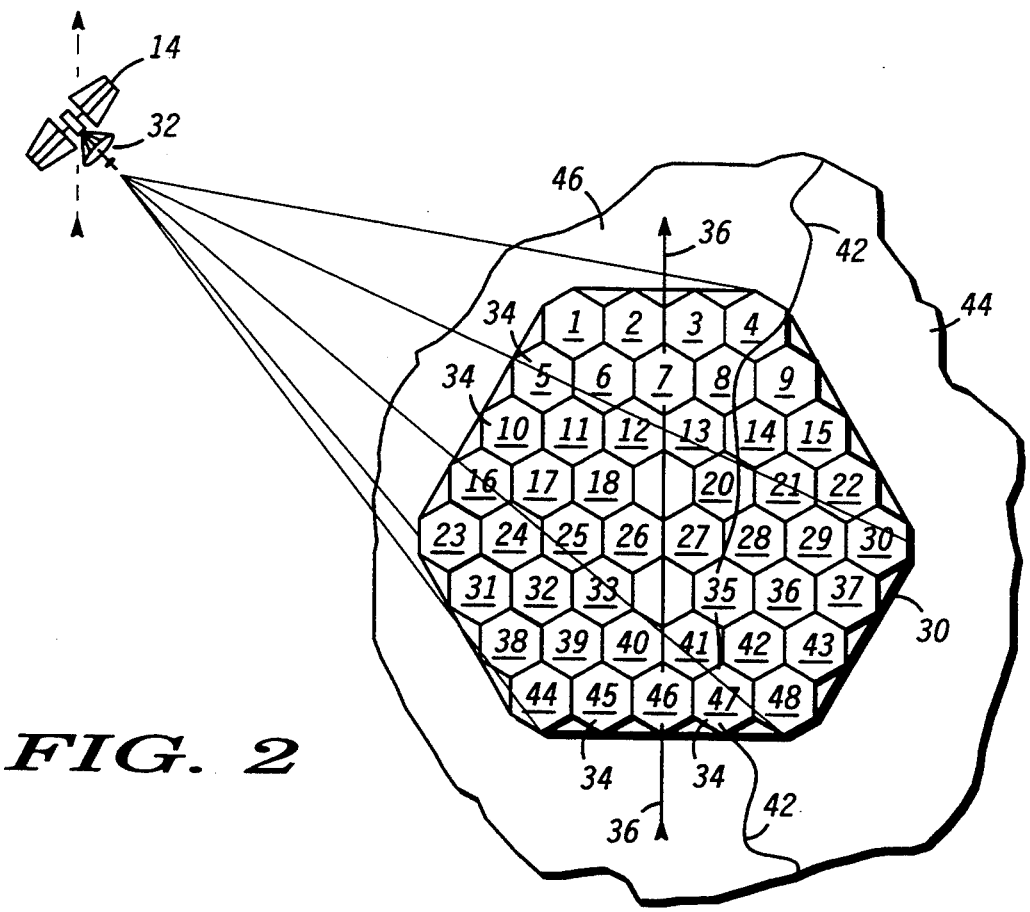
FIG. 2 shows a cellular pattern formed on the surface of the earth by a satellite portion of the radio telecommunications system.

FIG. 2 shows a cellular footprint pattern 30 formed on the surface of the earth by a single satellite 14. Each satellite 14 includes an array 32 of directional antennas. Each array 32 projects numerous discrete antenna patterns on the earth's surface at numerous diverse angles away from its satellite 14. FIG. 2 shows a diagram of a resulting pattern of cells 34 that a satellite 14 forms on the surface of the earth. Other satellites 14 (not shown) form other footprints (not shown) so that substantially the entire surface of the earth is covered by cells 34.

Each cell 34 within footprint 30 occupies a unique position within footprint 30. These positions are distinguished from one another through the use of a cell ID, listed as 1 through 48 in FIG. 2. Some degree of location information may be obtained by identifying a cell 34 that covers a position of interest. Such location information defines a position relative to a satellite 14. Satellites 14 preferably orbit the earth in predictable orbits. In other words, a satellite's position at a particular point in time may be determined by combining the point in time with well known orbital geometry. By combining a cell's position within a footprint 30 with the satellite's position, a location on the earth may be obtained.

For convenience, FIG. 2 illustrates cells 34 and footprint 30 as being discrete, generally hexagonal shapes without overlap or gaps. However, those skilled in the art will understand that in actual practice equal strength lines projected from the antennas of satellites 14 may actually have a shape far different than a hexagonal shape, that antenna side lobes may distort the pattern, that some cells 34 may cover larger areas than other cells 34, and that some overlap between adjacent cells may be expected.

System 10 (see FIG. 1) communicates through satellites 14 with SUs 24 (see FIG. 1) using a limited amount of the electromagnetic spectrum. The precise parameters of this spectrum are unimportant to the present invention and may vary from system to system. The present invention divides this spectrum into discrete portions or channel sets. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communications may take place at a common location over every channel set without significant interference. As is conventional in cellular communication systems, the channel sets are assigned to cells 34 through a reuse scheme which prevents adjacent cells 34 from using the same channel sets. However, common channel sets are reused in spaced apart cells 34 to efficiently utilize the allocated spectrum.

Each satellite 14 is associated with a nadir direction. The nadir direction is defined by an imaginary line (not shown) extending from the satellite 14 toward the center of the earth. For a given satellite 14, a ground point resides where the nadir direction intersects the surface of the earth. As the satellite 14 moves around the earth in its orbit, this ground point forms a satellite ground track 36. As shown in FIG. 2, a first portion of cells 34 in footprint 30 resides to the left of ground track 36 and a second portion of cells 34 in footprint 30 resides to the right of ground track 36.

On the surface of the earth, a boundary 42 separates a first jurisdiction 44 from a second jurisdiction 46. Any number of boundaries 42 may divide the entire earth's surface into any number of different jurisdictions. Boundaries 42 need not represent physical phenomena of the earth. Rather, boundaries 42 represent lines imposed over the geography of the earth to achieve some of the goals of radio telecommunication system 10 (see FIG. 1). Nothing prevents the existence of more than one set of boundaries 42 corresponding to the same sections of the earth. Boundaries 42 may divide the earth into geopolitical jurisdictions, communication service rate jurisdictions, and the like.

Figure 3:
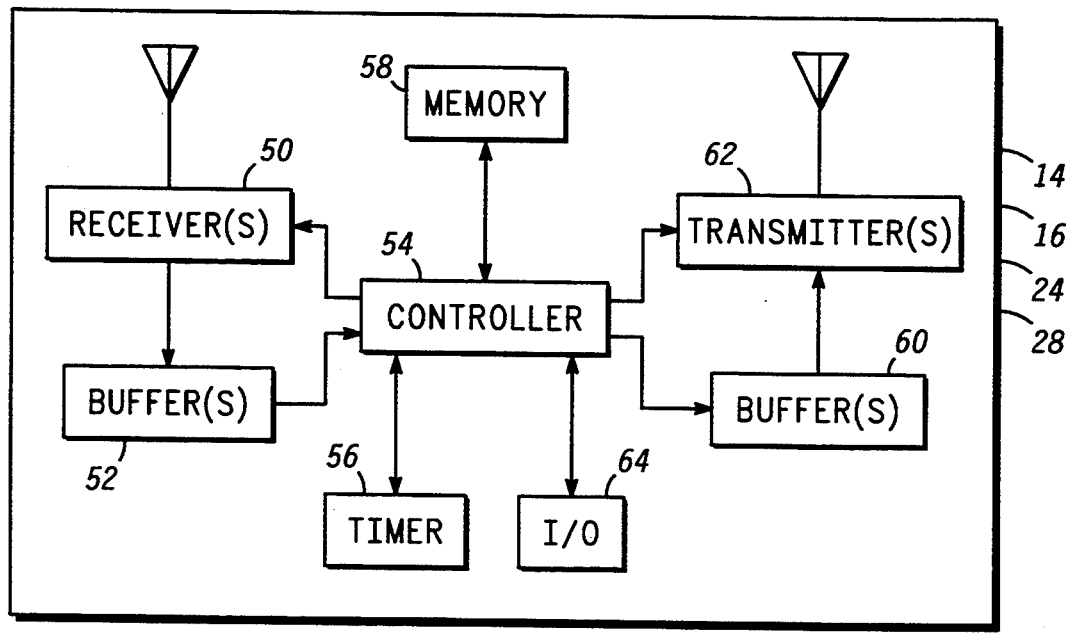
FIG. 3 shows a block diagram of a node of the radio telecommunications system.

FIG. 3 shows a block diagram of any node 48 of radio telecommunications system 10 (see FIG. 1). As discussed above, any SU 24, satellite 14, SO 16, or SIM 28 represents a node of system 10. Node 48 includes one or more receivers 50. Receivers 50 receive signals from communication channels 18, 20, and/or 26 (see FIG. 1). While an SU 24, SO 16, or SIM 28 may include only a single receiver 50, a satellite 14 includes many receivers for simultaneously communicating over numerous different ones of channels 18, 20, and 26 (see FIG. 1). Receivers 50 couple to receive buffers 52, which temporarily store data received at receivers 50 until these data can be processed.

A controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to controller 54 and which, when executed by controller 54, cause node 48 to carry out processes which are discussed below. In addition, memory 58 includes variables, tables, and databases that are manipulated due to the operation of node 48. Transmit buffers 60 are used to temporarily store data placed therein by controller 54. Controller 54 couples to transmitters 62 to control transmit parameters, such as frequency, timing, and the like. While SUs 24, SOs 16, and SIMs 28 may include only one transmitter 62, satellites 14 desirably include numerous transmitters 62 for simultaneously communicating over numerous different ones of channels 18, 20, and 26 (see FIG. 1). Transmit buffers 60 also couple to transmitters 62. Transmitters 62 transmit signals modulated to carry the data stored in transmit buffers 60. These signals are transmitted over channels 18, 20, and 26.

In earth-based nodes 48, controller 54 also couples to an I/O section 64. In an SU 24, I/O section 64 may include microphones, speakers, digitizers, vocoders, decoders, and the like, to convert between audio and digitized packets that are compatible with system 10 (see FIG. 1). Likewise, I/O section 64 may include a keypad for controlling the operation of SU 24 by a user. In an SO 16 or SIM 28, I/O section 64 may include keyboards, displays, magnetic memory devices, printers, and other devices conventionally coupled to computerized equipment. In an SO 16, I/O section 64 may additionally include components for coupling to a PSTN 22 (see FIG. 1).

In short, each node 48 represents a programmable machine which takes on the character assigned to it by software programming located in memory 58 and executed by controller 54. As is discussed below, the present invention configures nodes 48 as measurement processors 66 (see FIG. 4), location processors 68 (see FIG. 5), service processors 70 (see FIG. 8), and the like. Since each node 48 is or may be in data communication with other nodes 48, the precise location and distribution of many of these processors and the tasks they perform are less important considerations. By way of example, the functions of SIMs 28 may be performed on the same hardware which performs the functions of SOs 16, or the functions may be performed on different hardware. While the differences between processors 66, 68, and 70 may be physical due to their location in different ones of SUs 24, satellites 14, SOs 16, and SIMs 28, any physical differences may be of only minor importance. Rather, processors 66, 68, 70 are logically distinct from one another.

Figure 4:
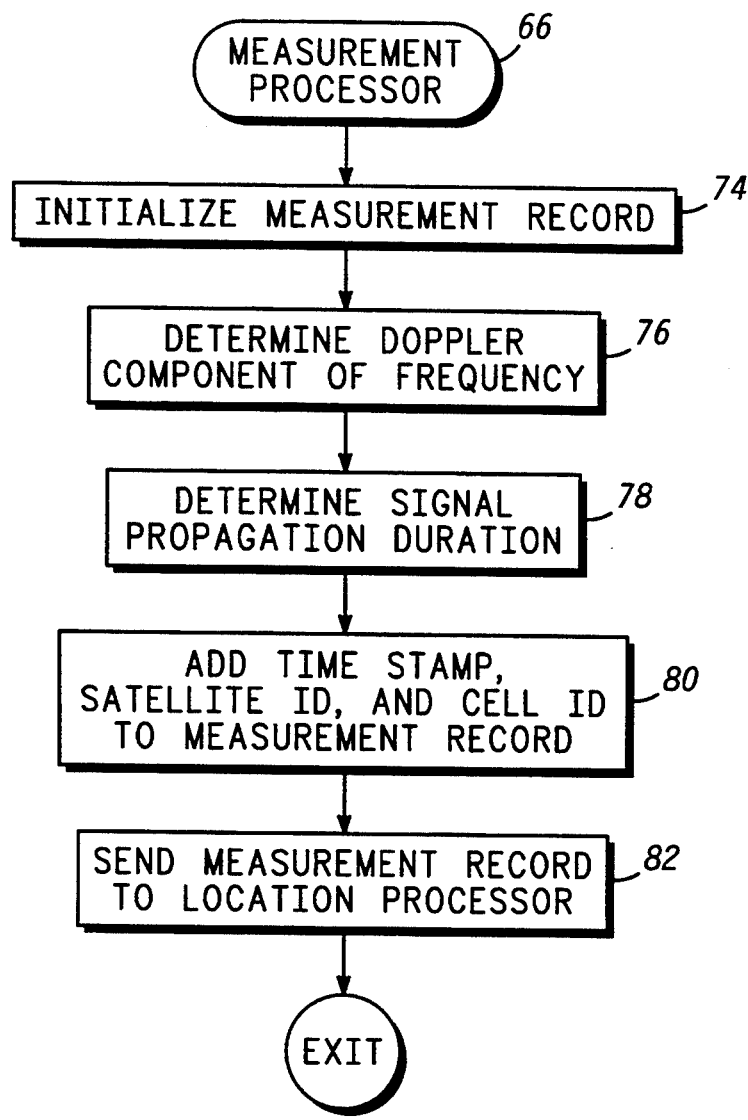
FIG. 4 shows a flow chart of tasks performed by a measurement processor portion of the radio telecommunications system.
Figure 5:
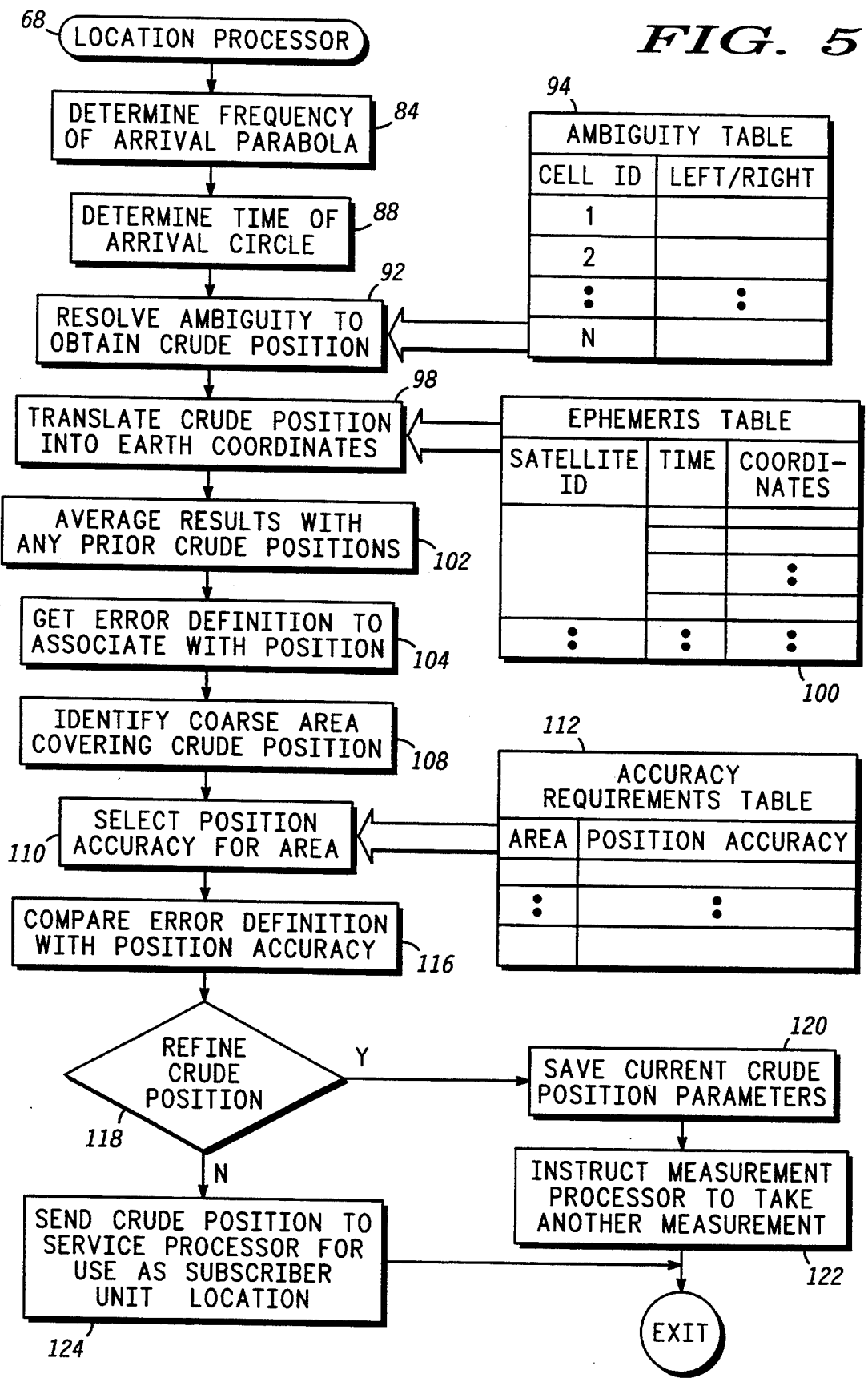
FIG. 5 shows a flow chart of tasks performed by a location processor portion of the radio telecommunications system.
Figure 8:
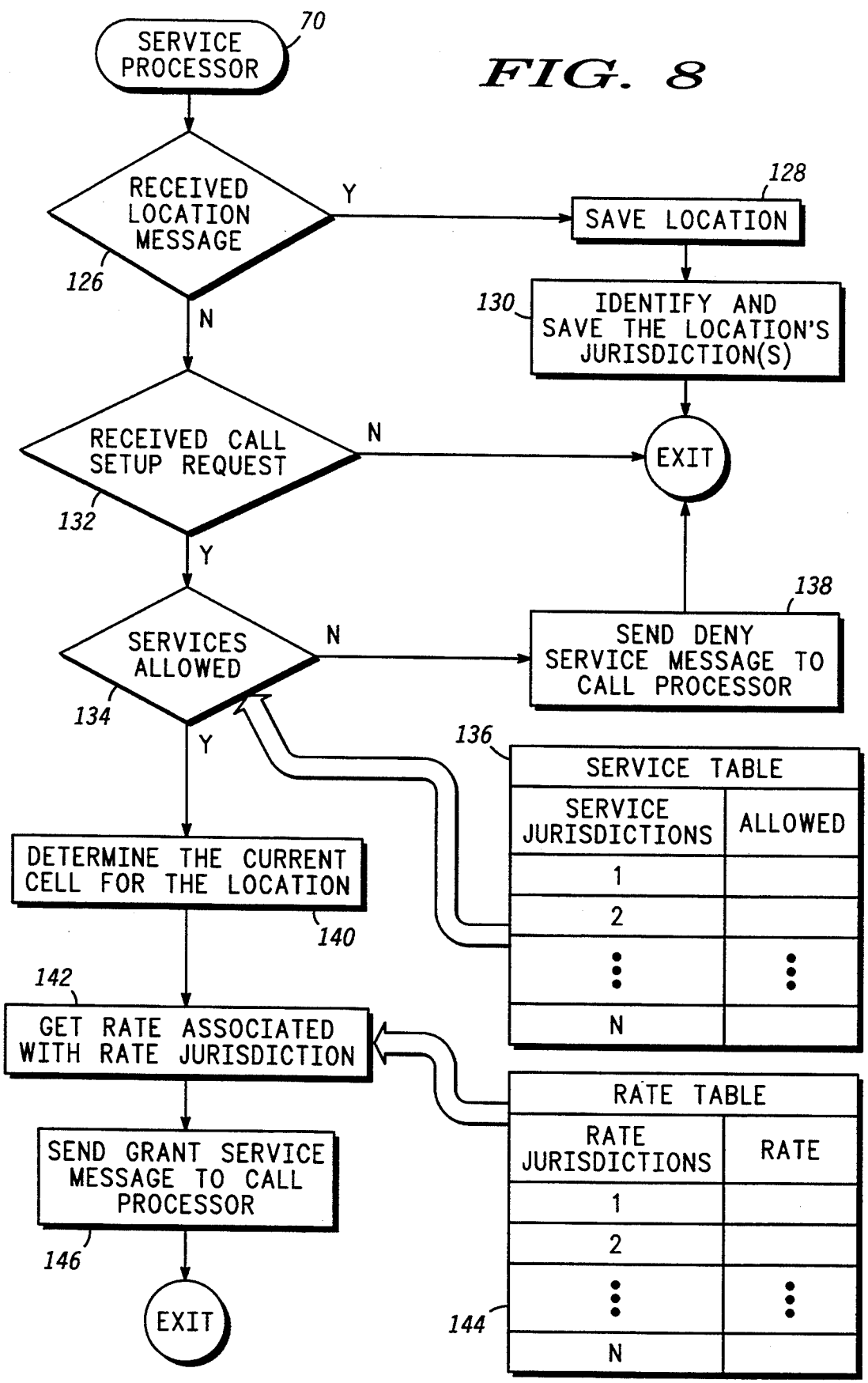
FIG. 8 shows a flow chart of tasks performed by a service processor portion of the radio telecommunications system.

FIGS. 4-5 and 8 depict processors 66, 68, and 70, respectively, which are implemented by nodes 48 within radio telecommunication system 10. Those skilled in the art will appreciate that the processors discussed below in connection with FIGS. 4-5 and 8 are controlled by programming instructions placed in a memory 58 of the node 48 where that processor may be located. Moreover, in the preferred embodiment of the present invention, all SUs 24, satellites 14, SOs 16, and SIMs 28 perform substantially the same processes as other SUs 24, satellites 14, SOs 16, and SIMs 28, respectively. Thus, while the description presented below is directed toward a single SU 24, a single satellite 14, a single SO 16, a single SIM 28, and a single call, the following description may be viewed as applying to all SUs 24, satellites 14, SOs 16, SIMs 28, and calls.

FIG. 4 shows a flow chart of tasks performed by measurement processor 66. The preferred embodiment of the present invention distributes the functions of measurement processor 66 between the communication node 48 (see FIG. 3) provided by satellite 14 and SU However, those skilled in the art could adapt measurement processor 66 to operate only at satellite 14 or only at SU 24 for other systems. Radio telecommunications system 10 activates measurement processor 66 with respect to a single specific SU 24 to obtain data which may be manipulated to determine the location of the SU 24. Any one of several different events may lead to the activation of processor 66. For example, processor 66 may be automatically activated when an SU 24 initially powers up, when an SU 24 is requesting to setup a call to a called party, or when location processor 68, discussed below (see FIG. 5), requests its activation.

Measurement processor 66 operates while communications take place between SU 24 and satellite 14. As is conventional in cellular communications, these communications take place within a particular one of cells 34 (see FIG. 2). Once activated by SU 24 accessing system 10, by SU 24 attempting to setup a call to a called party, by an instruction from location processor 68 (see FIG. 5), or otherwise, processor 66 performs a task 74 to initialize a measurement record. This initialization may, for example, include the writing of an SU's ID to the measurement record along with other parameters, such as frequency or channel ID, that describe the communications taking place between satellite 14 and SU 24.

After task 74, processor 66 performs a task 76 to determine the Doppler component of the frequencies used in communication channel 26 (see FIG. 1) for any electromagnetic signal traveling between SU 24 and satellite 14. This determination may, for example, be made by first synchronizing a frequency base used in SU 24 to the frequency base of satellite 14, then transmitting a signal from one of satellite 14 and SU 24 and receiving the signal at the other of satellite 14 and SU 24. The frequency of the received signal can then be measured to determine the frequency offset from a predetermined frequency. However, any alternate Doppler measurement technique known to those skilled in the art may be used as well. Task 76 then adds data describing the Doppler component to the measurement record.

In conjunction with task 76, or after task 76 as shown in FIG. 4, a task 78 determines signal propagation duration for any electromagnetic signal communicated between SU 24 and satellite 14. As discussed above, this duration may be in the range of 2-3 msec or more. This determination may be made by first synchronizing a time base used in SU 24 to the time base of satellite 14, then transmitting a signal from one of satellite 14 and SU 24 and receiving the signal at the other of satellite 14 and SU 24. The received signal may then be measured to determine any temporal offset from a predetermined point in time. However, any alternate propagation delay measurement technique known to those skilled in the art may be used as well. Task 78 then adds data describing the propagation duration to the measurement record.

After task 78, a task 80 completes the measurement record by adding a time stamp, the satellite's ID, and the ID of the cell 34 (see FIG. 2) within which the measured communications were conducted. The time stamp defines the point in real time at which the measured communications were taking place between SU 24 and satellite 14. After task 80, a task 82 sends the measurement record to location processor 68 (see FIG. 5). The measurement record contains location parameters that location processor 68 uses no determine the location of SU 24.

In the preferred embodiment, a location processor 68 resides in each SIM 28 (see FIG. 1). The particular SIM 28 which receives the measurement record is the home SIM 28 for the SU 24 whose location is being determined. This particular home SIM 28 may be distinguished from other SIMs 28 through the SU's ID. After task 82, program control exits measurement processor 66, and processor 66 becomes inactive. However, processor 66 may be reactivated at any time with respect to this or another SU 24. Moreover, nothing prevents processor 66 from being configured in a reentrant fashion in satellite 14 to simultaneously take measurements for more than one SU 24 at a time.

FIG. 5 shows a flow chart of tasks performed by location processor 68. While location processors 68 are preferably implemented in SIMs 28, those skilled in the art could adapt location processors 68 for implementation in any other node 48 (see FIG. 3) of system 10, or an independent node (not shown) can be established to implement a single location processor 68 for the entire system 10 and all SUs 24. Radio telecommunications system 10 activates location processor 68 with respect to a specific SU 24 when a measurement record relating to that SU 24 is received at the node 48 within which location processor 68 resides. Location processor 68 either forms a crude position estimate using the location parameters obtained in the measurement record or refines a previous crude position into a usable location for the SU 24.

In particular, location processor 68 performs a task 84 to determine a frequency of arrival hyperbola to fit the Doppler component data contained in the measurement record. Since satellites 14 are orbiting the earth and SUs 24 are located on or near the earth's surface, the direction with which a satellite 14 moves with respect to an SU 24 continually changes. Since this direction continually changes but satellite orbital speed remains relatively constant, the component of satellite velocity in a radial direction toward SU 24 continually changes. As a result of the continual velocity change, the Doppler component continually changes relative to a stationary SU 24 near the earth's surface. On the other hand, a given Doppler component could be reported from any point located on a hyperbolic shape geographically centered about satellite ground track 36 (see FIG. 2) and extending away from the satellite 14.

Figure 6:
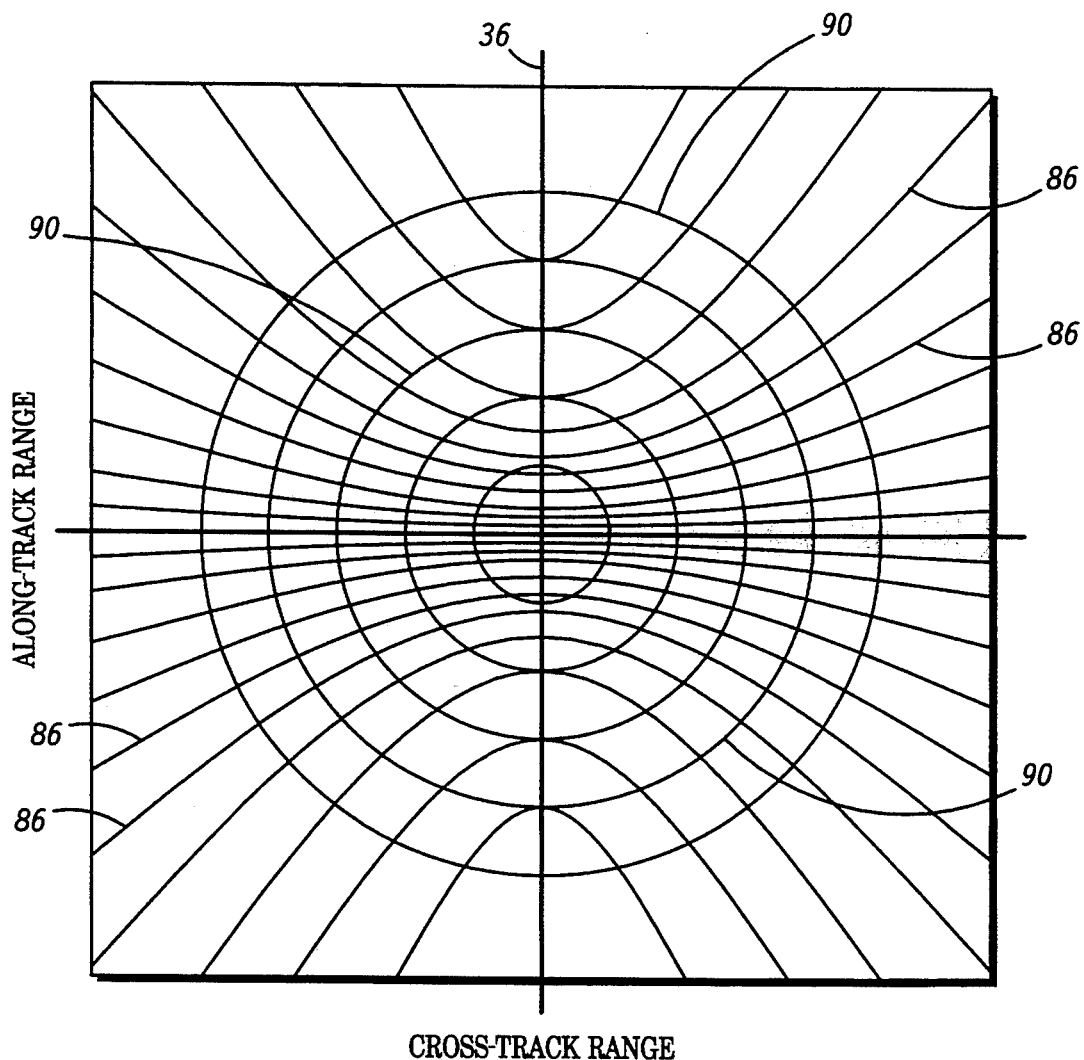
FIG. 6 graphically depicts constant Doppler and constant propagation duration curves which illustrate location determination in the radio telecommunications system.

FIG. 6 graphically depicts constant Doppler curves 86. As shown in FIG. 6, a given Doppler component may be graphically plotted on the surface of the earth as a hyperbola centered along satellite ground track 36 and extending away from a satellite 14. Higher Doppler rates result in thinner hyperbolas 86. At zero Doppler, which occurs when a satellite 14 is directly overhead an SU 24, the Doppler curve has an infinite width and resembles a straight line perpendicular to satellite ground track 36. The frequency of arrival curve determined in task 84 (see FIG. 5) represents the curve 86 that describes the Doppler component indicated in the measurement record.

Those skilled in the art will appreciate that the actual measured Doppler will characterize movement of SU 24 as well as movement of satellite 14. Radio telecommunications system 10 allows SUs 24 to move. However, due to the low earth orbits of satellites 14, satellites 14 move at a much greater speed than is possible for SUs 24 located on or near the earth. Consequently, the speed or movement of SUs 24 may be ignored for the purposes of this discussion.

Moreover, those skilled in the art will appreciate that a constant Doppler curve in three-dimensional space is actually a hollow, three-dimensional hyperbola. With reference back to FIG. 5, the results of task 84 need not describe the perimeter of this three-dimensional hyperbola but rather the two-dimensional intersection of this three-dimensional hyperbola on the surface of the earth. For convenience, the constant Doppler curves 86 shown in FIG. 6 ignore the minor distortion in shape caused by the curvature of the earth.

While the preferred embodiment of the present invention directly uses Doppler components, those skilled in the art will appreciate that Doppler may be used indirectly to identify other location curves. For example, those skilled in the art will appreciate that the above-described orbital geometry produces a Doppler component which changes in time. Nothing prevents detecting Doppler change and fitting curves to Doppler change rather than direct Doppler. Those skilled in the art will understand that the term Doppler as used herein is intended to encompass all such indirect usages of Doppler as well as direct usage of Doppler.

After task 84 determines the frequency of arrival hyperbola on the surface of the earth, a task 88 determines a time of arrival circle which fits the propagation duration data contained in the measurement record. Since electromagnetic signals propagate through the atmosphere at a constant velocity of approximately the speed of light, a given propagation duration dictates that the source of a signal responsible for the propagation duration must reside on the surface of a sphere having a radius approximately equal to the propagation duration times the speed of light and centered at the point where the signal is received. In the present invention, the source of an electromagnetic signal may be SU 24 residing on or near the surface of the earth and the signal may be received at satellite 14 orbiting the earth. Thus, a time of arrival circle represents the intersection of a sphere centered at satellite 14 and having a radius equivalent to the speed of light times the propagation duration with the earth's surface.

FIG. 6 graphically depicts constant time of arrival circles 90. As shown in FIG. 6, a given propagation duration may be graphically plotted on the surface of the earth as a circle centered at the point on satellite ground track 36 where the satellite's nadir direction intersects the surface of the earth. Longer propagation durations result in circles having larger radii. The time of arrival curve determined in task 88 (see FIG. 5) represents the circle 90 that describes the propagation duration indicated in the measurement record.

Figure 7:
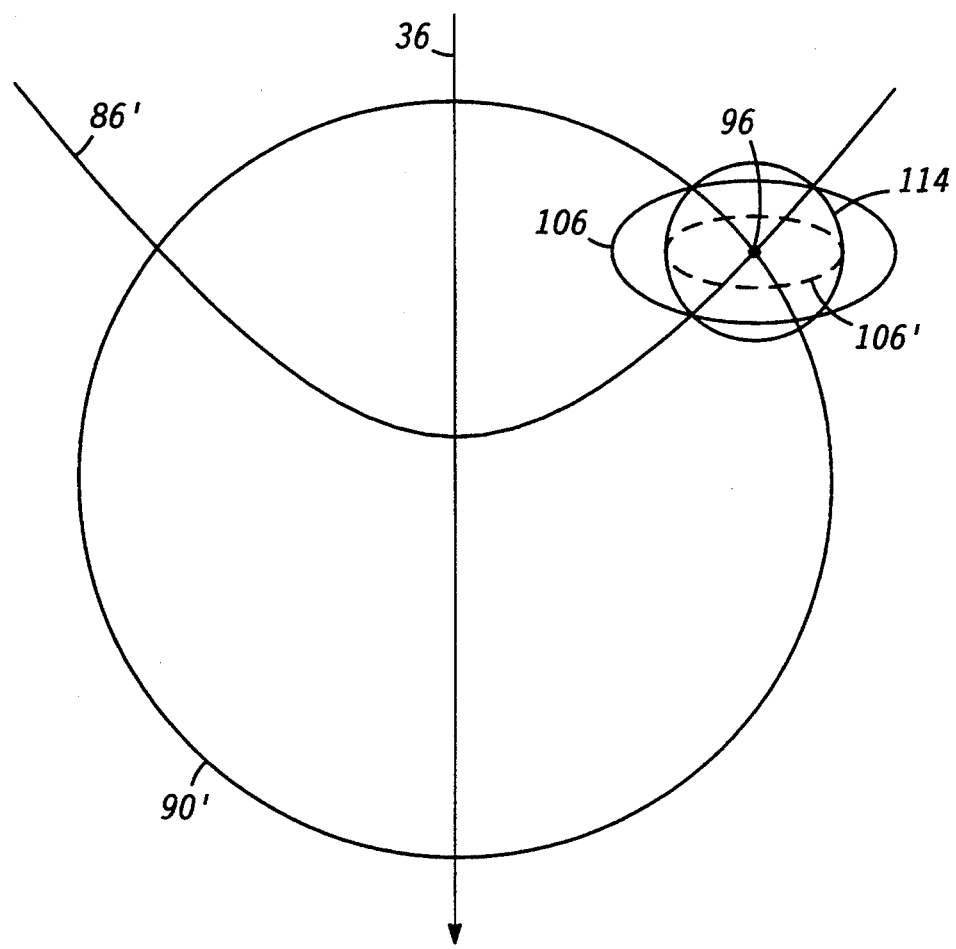
FIG. 7 graphically depicts an example of a subscriber unit location determined in the radio telecommunications system.

FIG. 7 graphically depicts an example of a subscriber unit location determined in accordance with location processor 68 (see FIG. 5). In particular, FIG. 7 depicts a single frequency of arrival curve 86' determined in task 84 (see FIG. 5) and a single time of arrival circle 90' determined in task 88. The intersection of frequency of arrival curve 86' with time of arrival curve 90' provides a two-position solution to the location determination problem. One of these two positions resides to the right of satellite ground track 36 and the other resides to the left of satellite ground track 36. Those skilled in the art will recognize that ground track 36 represents the axis of Doppler symmetry which is offset from the true satellite ground track by earths rotation. Of course, the two-position solution is ambiguous because only one of these two solutions is correct.

Referring back to FIG. 5, after tasks 84 and 88 have determined frequency and time of arrival curves 86' and 90', a task 92 resolves the ambiguity presented by the two-position solution. As shown in FIG. 2, each of cells 34 projected by satellite 14 has a unique ID associated with it. In addition, a first portion of these cells 34 resides to the right of ground track 36 and a second portion of these cells 34 resides to the left of ground track 36. Task 92 may consult an ambiguity table 94, a block diagram of which is shown in FIG. 5, to resolve this ambiguity. Table 94 is constructed to associate left-of-ground-track and right-of-ground-track status indications with each cell 34 included in a footprint 30 (see FIG. 2). Table 94 may be stored in memory 58 (see FIG. 3) of the node 48 (see FIG. 3) within which location processor 68 resides. Using the cell ID location parameter included in the measurement record, task 92 can look up a left/right status indication in table 94. With this status indication, task 92 selects one of the two positions and rejects the other. At this point in the process, location processor 68 has determined a crude position for SU 24. FIG. 7 depicts a crude position 96 as residing to the right of ground track 36 in the example depicted therein.

With reference to FIGS. 5 and 7, task 92 may resolve the ambiguity to determine the location of crude position 96 with respect to satellite 14. After task 92, a task 98 translates crude position 96 from coordinates based on satellite 14 into earth coordinates, such as latitude and longitude. Since satellite 14 travels in a predictable orbit, this translation may take place by consulting an ephemeris table 100, a block diagram of which is illustrated in FIG. 5. Ephemeris table 100 may be retained in memory 58 (see FIG. 3) of the node 48 (see FIG. 3) which implements location processor 68. Table 100 assigns earth coordinates for satellites 14 as a function of time. By using the satellite ID and time stamp data location parameters from the measurement record, and by applying conventional orbital geometry, task 98 may assign crude position 96 earth coordinates.

In an alternate embodiment, frequency of arrival curve 86' and time of arrival circle 90' may be translated directly into earth coordinates during tasks 84 and 88. Thus, the crude position 96 obtained in task 92 would automatically be defined in terms of earth coordinates, and task 98 would not need to perform a translation.

The accuracy of crude position 96 as set forth in task 98 may or may not be sufficient for the purposes of system 10. Many factors may contribute to inaccuracies. For example, the specific designs used in satellites 14 and SUs 24 contribute to the degree of accuracy with which crude position 96 defines an actual location for SU 24. The accuracy with which Doppler component, propagation duration, and real time can be measured contributes to the accuracy of the location parameters upon which crude position 96 is based. These factors are, for the most part, random errors that can be expressed through standard deviations or other statistical variance terms. Such variance terms are constant from measurement record to measurement record. They may be determined mathematically from design parameters for SU 24 and satellite 14, or they may be determined empirically.

Other accuracy factors relate to the nature of frequency and time of arrival curves 86 and 90, shown in FIG. 6. Referring briefly to FIG. 6, at locations where frequency of arrival hyperbolas 86 intersect time of arrival circles 90 at nearly right angles, small errors in Doppler component or propagation duration measurements result in small geographic location errors. These locations are found further away from the point where the satellite's nadir direction intersects the surface of the earth, particularly to the left and right of the satellite's ground track 36. The more tangential the frequency of arrival hyperbolas are to an intersecting time of arrival circle, the greater the geolocation error which results from small measurement errors. Moreover, the error is typically greater in a direction perpendicular to satellite ground track 36 than in a direction parallel to satellite ground track 36. These factors vary in accordance with the position of SU 24 relative to satellite 14. Together, all the accuracy factors suggest that crude position 96 probably does not describe the actual location for SU 24, but that the actual location resides somewhere close to crude position 96.

Referring back to FIG. 5, location processor 68 may make more than one crude position determination for any SU 24 before concluding that sufficient accuracy has been achieved. Additional location determinations are performed through repetitions or reactivations of location processor 68 to process additional measurement records constructed for the same SU 24. Thus, location processor 68 may perform a task 102 to average the crude position 96 obtained above in task 98 for the current repetition of location processor 68 with any prior crude positions 96 obtained in a prior repetition of location processor 68. Of course, no averaging occurs with the first iteration of location processor 68. The averaging of crude positions determined from a plurality of location parameter sets refines the definition of crude position 96 and reduces inaccuracies associated with crude position 96. Of course, those skilled in the art will appreciate that such averaging may alternatively take place above in tasks 84, 88, and 92 as well. The averaging of results from additional iterations of the location process causes the location accuracy to improve in a manner well known to those skilled in the art.

By averaging a plurality of crude positions 96 obtained from a plurality of location parameter sets, those skilled in the art will appreciate that a wide variety of "averaging" techniques are contemplated by the present invention. For example, the preferred embodiments average crude positions through the use of well known minimum least squares error or maximum likelihood curve fitting techniques. However, those skilled in the art may devise other averaging techniques to cause a plurality of error-prone location parameter measurements to converge on a solution for the actual location of SU 24.

After task 102, a task 104 gets an error definition to associate with the crude position 96 determined so far by location processor 68. This error definition is a function of the current crude position 96 relative to satellite 14, the variance terms that characterize the location parameters, and the number of location parameter measurements processed by various repetitions of location processor 68. The error definition resembles an ellipse 106, an example of which is shown in FIG. 7. Ellipse 106 is centered at crude position 96. At positions relative to satellite 14 where error is minimal, ellipse 106 is more circular and covers a relatively small area. At positions relative to satellite 14 where error is greater, the ellipse's area increases and its shape becomes more flattened, with a major axis extending perpendicular to the satellite's ground track 36. The error definition may be obtained by a table look-up operation using data describing the relative location of crude position 96 to satellite 14 and the number of location parameter sets that have been averaged to result in a current, more refined, crude position 96.

With reference back to FIG. 2, boundary 42 passes through cells 4, 8, 14, and so on while being spaced a considerable distance apart from cells 16, 23, 31, 30, 37, and so on. System 10 uses knowledge about the side of boundary 42 on which SU 24 resides to qualify services offered to SU 24. Thus, the accuracy required in locating an SU 24 which appears to reside in a cell 34 near boundary 42 is greater than for an SU 24 that appears to reside in a cell 34 residing a distance away from boundary 42. Accordingly, location processor 68 may refrain from engaging in excessive repetitions of processing location parameter sets when the high degree of accuracy achievable by such repetitions is not needed. On the other hand, when high accuracy in determining the location of SU 24 is needed, such as when a SU 24 appears to be near a boundary 42, location processor 68 may perform as many repetitions as required to achieve a desired level of accuracy. By engaging in no more repetitions of processing location parameter sets than are necessary for the particular location, service interruption due to location determination is minimized and system capacity is reserved for other tasks which might achieve greater benefit. In other words, the convergence of crude position 96 upon the actual position of SU 24 is adapted to meet the accuracy needs appropriate for that position.

Referring back to FIG. 5, after task 104, a task 108 identifies a coarse area that covers crude position 96. This coarse area is used in determining the accuracy needed at a particular crude position 96. The present invention contemplates a wide range of coarse area definitions. For example, the coarse area definition may be obtained by converting the cell ID, satellite ID, and time stamp location parameters from the measurement record into a definition of an area that covers particular earth coordinates, such as a center-of-cell point and an approximate cell radius. Alternatively, a local area code (LAC) may be used as a coarse indication of area or the crude position itself, when associated with a predetermined radius may serve as a coarse indication of area. Crude position 96 will be covered by the coarsely defined area indicated through any one of these or other techniques. In other words, crude position 96 will reside within the indicated area.

After task 108, a task 110 selects a position accuracy parameter that is associated with the area specified above in task 108. For example, an accuracy requirements table 112, an example of which is depicted in FIG. 5, may be retained in memory 58 (see FIG. 3) of the node 48 (see FIG. 3) which implements location processor 68. Table 112 assigns a position accuracies as a function of area. In the preferred embodiment of the present invention, position accuracy varies in response to areas. Greater position accuracies are associated with areas nearer boundaries 42 (see FIG. 2). Position accuracy may be defined as a circle centered at crude position 96, such as circular error probability (CEP) 114 depicted in FIG. 7. Table 112 may specify the radii of various CEPs. Thus, task 110 may match the coarse area determined above in task 108 with one of the areas listed in table 112, then obtain the position accuracy associated with that area.

After task 110, a task 116 compares the error definition, such as error ellipse 106 (see FIG. 7) with the position accuracy, such as CEP 114 (see FIG. 7) obtained above in task 110. Task 116 compares the area of error ellipse 106 with the area of CEP 114. After task 116, a query task 118 determines whether the error is less than the position accuracy. The error is less if a predetermined percentage of the area of error ellipse 106 fits within CEP 114. However, other statistical curve-fitting techniques may be applied as well. Thus, task 118 decides whether to further refine the definition of crude position 96. Further refinement is needed unless the area of error ellipse 106 is sufficiently confined within CEP 114.

If the error is not less than the allowable error, a task 120 saves the current location and crude position parameters for averaging with future measurements in a future iteration of location processor 68 with respect to the SU 24. Next, a task 122 sends a message to measurement processor 66 (see FIG. 4) to instruct it to take another measurement. After task 122, program control exits location processor 68, and location processor 68 becomes temporarily inactive with respect to the SU 24 and this location determination. However, when the next measurement record is received for the SU 24 at the node 48 where location processor 68 resides, location processor 68 reactivates. As discussed above, location processor will refine the definition of crude position 96 though a curve-fitting statistical averaging technique. This refinement will cause the area of error ellipse 106 (see FIG. 7) to shrink while slightly altering the definition of crude position 96.

At some future iteration of location processor 68 with respect to SU 24 the error ellipse will shrink to a point where task 118 will determine that the error is less than the position accuracy. This situation is graphically illustrated in FIG. 7 by error ellipse 106', shown in phantom. At this point, system 10 requires no further refinement of crude position 96. Thus, a task 124 sends the crude position to service processor 70 (see FIG. 8), discussed below, in a location-determined message. At this point, this location determination is complete, the crude position is now considered as the location for SU 24, and program control exits. Location processor 68 again becomes inactive. However, location processor 68 reactivates for other location determinations, whether for this or other SUs 24.

FIG. 8 shows a flow chart of tasks performed by service processor 70. The preferred embodiment of the present invention implements a service processor 70 in each SIM 28 (see FIG. 1). In particular, the home SIM 28 for an SU 24 implements service processor 70 for that SU 24. However, those skilled in the art could adapt service processor 70 for implementation in any other node 48 (see FIG. 3) of system 10, or an independent node (not shown) can be established to implement a single service processor 70 for the entire system 10. Generally speaking, service processor 70 qualifies communication services provided by system 10 to the SU 24 and its user in response to the subscriber unit location indicated in the location-determined message.

Radio telecommunications system 10 activates service processor 70 with respect to a single specific SU 24 when a location-determined message relating to that SU 24 is received at the node 48 within which service processor 70 resides. In addition, service processor 70 is activated when a message requesting a call setup involving that SU 24 is received. This node 48 may be the same node 48 which implements location processor 68 (see FIG. 5), and the location-determined message may be delivered by placing the message in an appropriate queue being managed in memory 58 of that node 48.

In particular, service processor 70 performs a query task 126 to determine whether a location-determined message has been received. If a location-determined message has been received, a task 128 saves the location data contained in the message in association with the SU 24 to which the location relates. After task 128, a task 130 identifies all relevant jurisdictions, discussed above in connection with FIG. 2, within whose domains the location resides. The jurisdictions may be geopolitical jurisdictions, rate jurisdictions, feature jurisdictions, and the like. When the jurisdictions are identified, IDs associated with the relevant jurisdictions are saved in association with the SU 24 to which the location relates for future use by service processor 70. After task 130, program control exits service processor 70, and service processor 70 becomes inactive. However, service processor 70 will activate again with respect to this SU 24 when a call setup involving this SU 24 is requested.

A subsequent activation of service processor 70 may be detected when task 126 determines that a location message has not been received. In this situation, a query task 132 determines whether a call setup request message has been received at service processor 70 with respect to the SU 24. The call setup request message is received when someone is attempting to setup a call involving the SU 24. The SU 24 may be either a calling party or a called party. If a call setup request message has not been received, program control exits service processor 70, and service processor 70 becomes inactive.

When a call setup request message is received, a query task 134 determines whether communication services are allowed for the SU 24. In deciding whether communication services are allowed for the SU 24, task 134 may consult a service table 136 stored in memory 58 of the node 48 which implements service processor 70. Service table 136 associates service jurisdictions with indications of whether communication services are allowed or not. The service jurisdictions may, for example, be geopolitical jurisdictions. These jurisdictions were identified above in connection with task 130.

If communication services are not allowed, a task 138 is performed to send a deny service message to the call processor (not shown) which sent the call setup request message to service processor 70. The call processor will take appropriate steps to realize the qualification to communication services indicated through task 138. After task 138, program control exits service processor 70, and service processor 70 becomes inactive.

If task 134 determines that communication services are allowed, a task 140 determines the current satellite 14 and cell 34 that cover the location saved above in task 128 for this SU 24 during a previous activation of service processor 70. This satellite 14 and cell 34 may be different from the satellite 14 and cell 34 which were involved in location determination, discussed above, due to the movement of satellites 14. This determination may be made by applying the current time and the location saved above in task 128 to the orbital geometry associated with constellation 12 (see FIG. 1) of satellites 14. After task 140, a task 142 gets a call rate to be used for the upcoming call. Task 142 may consult a rate table 144 stored in memory 58 of the node 48 which implements service processor 70. Rate table 144 associates rate jurisdictions with rate descriptions. Any rate description conventional in the art of telephony is contemplated for rate table 144. Such rate descriptions may be complex formulas which vary rates depending on time of day, direction of call, number of minutes over which a call takes place, and the like. These rate jurisdictions were identified above in connection with task 130. They may or may not correspond to the service jurisdictions discussed above in connection with task 134.

After task 142, a task 146 sends a grant service message to the call processor (not shown) that sent the call setup request message to service processor 70. In addition, if SU 24 is the called party, task 146 may send the grant service message to a call processor (not shown) that is serving SU 24. This called-party call processor may be identified by the location information saved in task 128 or by a jurisdiction identified above in task 130.

The grant service message will include the cell ID, and rate data determined above in tasks 140 and 142. The call processor will continue setting up the requested call in a manner consistent with conventional telephony techniques. The communication services provided by system 10 throughout the call will be qualified through the rate data included in the grant service message. After task 146, the communication services to be offered for the call have been qualified in response to the SU's location, and program control exits service processor 70. Service processor 70 again becomes inactive. However, service processor 70 reactivates for other location-determined messages or other call setup request messages, whether for this or other SUs 24. While the service processor 70 discussed above qualifies communication services based on an SU's location, nothing prevents other processors from qualifying communication services based on other factors, such as payment of accounts. Alternatively, service processor 70 may be expanded to qualify communication services based on such other factors as well as an SU's location.

In summary, the present invention provides an improved radio telecommunications system and method. The system and method of the present invention automatically determine locations for subscriber units. A subscriber unit's location is determined using a satellite which orbits the earth in a low earth orbit. No more than one satellite needs to be used to determine a subscriber unit's location. Moreover, the low earth orbit is advantageous for communications because lower power subscriber units may be used and spectrum may be reused more efficiently.

An iterative process is used to refine a crude position into a solution which converges on a subscriber unit's actual location. Subscriber unit locations are determined relatively quickly for the vast majority of locations. Relatively inaccurate location determination accuracy is sufficient for the vast majority of locations, and no more iterations of the location process are performed than are necessary. The present invention identifies when greater accuracy is required, and additional iterations of the location determination process are performed only when required to achieve the greater accuracy. In short, the present invention refrains from wasting time and system capacity in resolving location to a greater degree of accuracy than is needed by the system. Once a location has been determined, the system and method of the present invention use this location to qualify communication services offered by the system.

The present invention has been described above with reference to preferred embodiments. However, those skilled in the art will recognize that changes and modifications may be made in these preferred embodiments without departing from the scope of the present invention. For example, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. Changes and modifications which are obvious to those skilled in the art are intended to be included within the scope of the present invention.

What is claimed is:

1. A method of operating a radio telecommunications system having at least one communication node and having at least one subscriber unit placed to communicate with said node, said method comprising the steps of:

communicating between said node and said subscriber unit to obtain a set of location parameters;

obtaining a crude position for said subscriber unit in response to said set of location parameters, said crude position having an error associated therewith;

determining a position accuracy for said crude position;

deciding, in response to said position accuracy and said error, whether to refine said crude position by repeating said communicating, obtaining, and determining steps, said crude position serving as a subscriber unit location when said deciding step decides not to refine said crude position; and qualifying communication services provided for said subscriber unit in response to said subscriber unit location.

2. A method of operating a radio telecommunications system as claimed in claim 1 additionally comprising the step of identifying a course area that includes said crude position, and wherein the determining step further comprises the step of selecting said position accuracy based on said coarse area.

3. A method of operating a radio telecommunications system as claimed in claim 1 wherein:

said method additionally comprises the step of associating a plurality of position accuracies with a corresponding plurality of areas; and said determining step obtains said position accuracy for said crude position by selecting the one of said plurality of position accuracies associated with the one of said areas that corresponds to said crude position.

4. A method of operating a radio telecommunications system as claimed in claim 1 wherein:

said deciding step causes said obtaining step to be repeated; and said obtaining step is configured to average said crude position obtained in a current repetition with said crude position obtained in a previous repetition to refine said crude position.

5. A method of operating a radio telecommunications system as claimed in claim i wherein said method additionally comprises the step of causing one of said node and said subscriber unit to move relative to the other of said node and said subscriber unit, and said communicating step comprises the steps of:

transmitting a signal from one of said node and said subscriber unit to the other of said node and said subscriber unit; and determining a Doppler component of said signal; and using said Doppler component as one of said location parameters.

6. A method of operating a radio telecommunications system as claimed in claim 5 wherein said method additionally comprises the step of causing one of said node and said subscriber unit to be spaced apart from the other of said node and said subscriber unit, and said communicating step further comprises the steps of:

determining a duration required for said signal to propagate between said node and said subscriber unit; and using said propagation duration as one of said location parameters.

7. A method of operating a radio telecommunications system as claimed in claim 5 wherein said communicating step further comprises the steps of:

identifying a time that describes when said transmitting step occurs; and using data describing said time as one of said location parameters.

8. A method of operating a radio telecommunications system as claimed in claim 7 wherein said node is a satellite orbiting the earth, and said obtaining step comprises the steps of:

determining a position for said subscriber unit relative to said satellite; and translating said position to earth coordinates in response to said time data.

9. A method of operating a radio telecommunications system as claimed in claim 1 wherein said method additionally comprises the step of causing one of said node and said subscriber unit to be spaced apart from the other of said node and said subscriber unit, and said communicating step comprises the steps of:

transmitting a signal from one of said node and said subscriber unit to the other of said node and said subscriber unit;

detecting a duration required for said signal to propagate between said node and said subscriber unit; and using said propagation duration as one of said location parameters.

10. A method of operating a radio telecommunications system as claimed in claim 1 additionally comprising the steps of:

causing said node and a second node to move in one or more orbits around the earth;

associating first and second identification data with said node and said second node, respectively; and using said first identification data as one of said location parameters.

11. A method of operating a radio telecommunications system as claimed in claim 1 wherein:

said node is a satellite moving in an orbit around the earth;

said satellite movement causes a nadir direction of said satellite to intersect the earth along a ground track of said satellite; and said obtaining a crude position step comprises the step of determining upon which side of said satellite ground track said subscriber unit resides.

12. A method of operating a radio telecommunications system as claimed in claim 11 wherein:

a first plurality of cells is projected from said satellite toward the earth on a first side of said satellite ground track, and a second plurality of cells is projected from said satellite toward the earth on a second side of said satellite ground track; and said obtaining step comprises the step of determining whether communications occurring during said communicating step took place in one of said first plurality of cells or in one of said second plurality of cells.

13. A method of operating a radio telecommunications system having at least one satellite moving in an orbit around the earth in which a nadir direction of said one satellite intersects the earth along a satellite ground track, and said system having at least one subscriber unit located proximate the earth's surface, said method comprising the steps of:

a) determining a Doppler component of an electromagnetic signal traveling between said satellite and said subscriber unit;

b) determining a duration for which an electromagnetic signal travels between said satellite and said subscriber unit;

c) determining two potential positions of said subscriber unit relative to the earth in response to said Doppler component and said duration;

d) selecting one of said two potential positions as a crude position for said subscriber unit by resolving upon which side of said satellite ground track said subscriber unit resides, said crude position having an error associated therewith;

e) determining a position accuracy;

f) deciding, in response to said position accuracy and said error, whether to refine said crude position by repeating said steps a), b), c), and d), said crude position serving as a subscriber unit location when said deciding step decides not to refine said crude position; and g) qualifying communication services provided for said subscriber unit in response to said subscriber unit location.

14. A method of operating a radio telecommunications system as claimed in claim 13 additionally comprising the step of identifying a course area that includes said crude position, and wherein step (e) comprises the step of selecting said position accuracy based on said coarse area.

15. A method of operating a radio telecommunications system as claimed in claim 13 wherein:

said method additionally comprises the step of associating a plurality of position accuracies with a corresponding plurality of areas; and said step e) obtains said position accuracy by selecting the one of said plurality of position accuracies associated with the one of said areas that corresponds to said crude position.

16. A method of operating a radio telecommunications system as claimed in claim 13 wherein:

said step f) causes said steps a), b), c), and d) to be repeated; and said step d) is configured to average said crude position obtained in a current repetition with said crude position obtained in a previous repetition to refine said crude position.

17. A method of operating a radio telecommunications system as claimed in claim 13 wherein:

said step f) causes said steps a), b), c, d) and e) to be repeated; and said step d) is configured to average said crude position obtained in a current repetition with said crude position obtained in a previous repetition to refine said crude position.

18. A radio telecommunications system for providing communication services to users, said system comprising:

at least one satellite moving with respect to the earth's surface in an orbit around the earth;

a measurement processor residing in at least one of said satellite, said measurement processor being configured to determine a Doppler component of an electromagnetic signal traveling between said satellite and a subscriber unit located proximate the earth's surface;

a location processor in data communication with said measurement processor, said location processor being configured to determine a crude position for said subscriber unit in response to said Doppler component, to identify a course area covering said crude position, to select a position accuracy for said course area, and to control said measurement processor in determining additional Doppler components of additional electromagnetic signals, said location processor using said additional Doppler components to refine said crude position into a subscriber unit location in response to said position accuracy; and a service processor in data communication with said location processor, said service processor being configured to qualify communication services provided for said subscriber unit in response to said subscriber unit location.

19. A radio telecommunications system as claimed in claim 18 wherein:

said measurement processor is additionally configured to determine a duration for which an electromagnetic signal travels between said satellite and said subscriber unit; and said location processor is additionally configured so that said crude position and system location are determined in response to said Doppler component and said duration.

20. A radio telecommunications system for providing communication services to users, said system comprising:

at least one satellite moving in an orbit around the earth;

at least one subscriber unit located proximate the earth's surface;

a measurement processor residing in at least one of said satellite and said subscriber unit, said measurement processor being configured to determine a Doppler component of an electromagnetic signal traveling between said satellite and said subscriber unit;

a location processor in data communication with said measurement processor, said location processor being configured to determine a crude position for said subscriber unit in response to said Doppler component, to control said measurement processor in determining additional Doppler components of additional electromagnetic signals, and to refine said crude position into a subscriber unit location; and a service processor in data communication with said location processor, said service processor being configured to qualify communication services provided for said subscriber unit in response to said subscriber unit location, wherein:

said crude position has an error associated therewith;

said location processor comprises means for associating a plurality of position accuracies with a corresponding plurality of areas;

said location processor is configured to select the one of said plurality of position accuracies associated with the one of said areas that corresponds to said crude position; and said location processor is further configured to decide, in response to said selected position accuracy and said error, whether to refine said crude position, said crude position serving as said subscriber unit location when said location processor decides not to refine said crude position.

21. A radio telecommunications system as claimed in claim 20 wherein the means for associating is configured so that different of said plurality of position accuracies are associated with different of said corresponding plurality of areas.

* * * * *

UNITED STATES PATENT AND TRADEMARK OFFICE
CERTIFICATE OF CORRECTION

PATENT NO.   :  5,444,450
DATED        :  August 22, 1995
INVENTOR(S)  :  Keith A. Olds and Kristine P. Maine It is certified that error appears in the above-indentified patent and that said Letters Patent is hereby corrected as shown below:

In Claim 5, column 17, line 42, replace "claim i" with --claim 1--.

Signed and Sealed this

Nineteenth Day of December, 1995

Attest:

BRUCE LEHMAN

Attesting Officer          Commissioner of Patents and Trademarks